United States Patent
Lorenzino et al.

[15] 3,691,841
[45] Sept. 19, 1972

[54] TEMPERATURE COMPENSATOR

[72] Inventors: Paul Lorenzino; Robert G. Love, both of Duncan, Okla.

[73] Assignee: Halliburton Company, Duncan, Okla.

[22] Filed: May 12, 1970

[21] Appl. No.: 36,629

[52] U.S. Cl..................73/326 R, 73/349, 317/247, 331/66, 331/68
[51] Int. Cl...........................G01k 7/34, G01k 13/02
[58] Field of Search............73/362 R, 349; 317/247; 331/68

[56] References Cited

UNITED STATES PATENTS

| | | | |
|---|---|---|---|
| 2,011,710 | 8/1935 | Davis | 73/362 R |
| 3,154,060 | 8/1964 | Hundere | 73/346 X |
| 3,192,455 | 6/1965 | Bergeson | 317/247 |
| 3,478,589 | 11/1969 | Birken | 73/362 R |

*Primary Examiner*—Louis R. Prince
*Assistant Examiner*—Frederick Shoon
*Attorney*—Burns, Doane, Swecker & Mathis

[57] ABSTRACT

A constant plate area and spacing capacitance temperature probe for insertion into a fluid stream which is non-responsive to changes in pressure or content of the fluid investigated. Means for accommodating temperature induced changes in the dielectric fluid confined within the probe are provided internally of the interior of two concentric electrodes, the outermost of which serves to confine the dielectric fluid.

16 Claims, 4 Drawing Figures

PATENTED SEP 19 1972

3,691,841

INVENTORS
PAUL LORENZINO, JR.
ROBERT G. LOVE

BY
Burns, Doane, Benedict, Swecker & Mathis
ATTORNEYS

TEMPERATURE COMPENSATOR

BACKGROUND OF THE INVENTION

The present invention relates to temperature probes and, more specifically, to temperature probes of the capacitance type.

Capacitance probes have long been used to measure the temperature and/or pressure of fluids. One such capacitance probe comprises a pair of spaced electrodes connected in the tank circuit of an oscillator in which a column of mercury serves as one plate of the capacitor and condition-induced changes in the volume of the mercury thus vary the area of the capacitor. An example of this type of device is shown in the Edwards U.S. Pat. No. 3,190,122.

Other prior art capacitance probes have varied, either alone or in combination, the plate spacing and the area between the plates which is occupied by a dielectric liquid responsively to changes in temperature or pressure. An example of a probe of this type is disclosed in the Hudson U.S. Pat. No. 2,944,199.

The subject invention avoids the difficulties associated with movable electrodes in the variable spacing electrode probes and the calibration problems resulting from the disposition of two fluids of differing dielectric constants, e.g., mercury and air, between the electrodes by the utilization of rigid electrodes and a single fluid dielectric where density is variable in response to changes in temperature.

Probes have also been proposed wherein the plates of a capacitor are isolated from but disposed in a fluid in heat or pressure-transmitting relation to a second fluid, the temperature or pressure of which it is desired to measure. This is desirable where the fluid investigated is unsuitable for use as the dielectric between the plates of the capacitor. An example of a device of this type is illustrated in the Birken U.S. Pat. No. 3,478,589. It has not, however, been generally known that such a device could be utilized to measure temperature changes in a flowing fluid whose pressure and composition is subject to rapid change. Nor have such prior art systems accommodated the temperature-induced changes in the volume of the dielectric fluid between the plates of the capacitor.

It is accordingly an object of the present invention to obviate the deficiencies of the prior art and to provide a novel capacitance for measuring the temperature of a fluid medium variable in composition and pressure.

It is another object of the present invention to provide a novel capacitance temperature probe which eliminates the effects of external pressure on the dielectric while providing means for accommodating temperature-induced changes in volume and avoiding changes in the spacing or area of the plates.

It is still another object of the present invention to provide a novel probe structure particularly adapted for measuring the temperature of a flowing medium such as the effluent from a producing oil well and which is not responsive to changes in the pressure or content of the fluid to be measured.

It is yet another object of the present invention to provide novel means for accommodating temperature-induced changes in the volume of the fluid dielectric confined within a temperature-sensitive capacitance probe.

These and other objects of the present invention will be apparent to one skilled in the art to which the invention pertains from a perusal of the claims and from the following detailed description of a preferred embodiment when read in conjunction with the appended drawings.

DESCRIPTION OF THE PREFERRED EMBODIMENT

Figure 1:
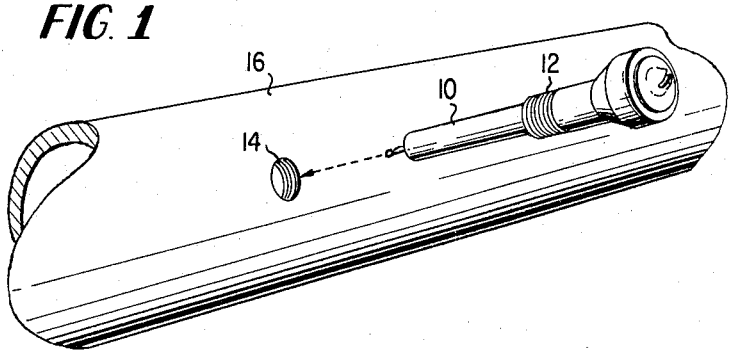
FIG. 1 is a pictorial representation of the temperature probe of the present invention as utilized to measure the temperature of a fluid in a fluid conduit.

As illustrated in FIG. 1, a temperature probe 10 having an externally threaded portion 12 may be inserted into an internally threaded aperture 14 in the wall of a pipeline 16.

Figure 2:
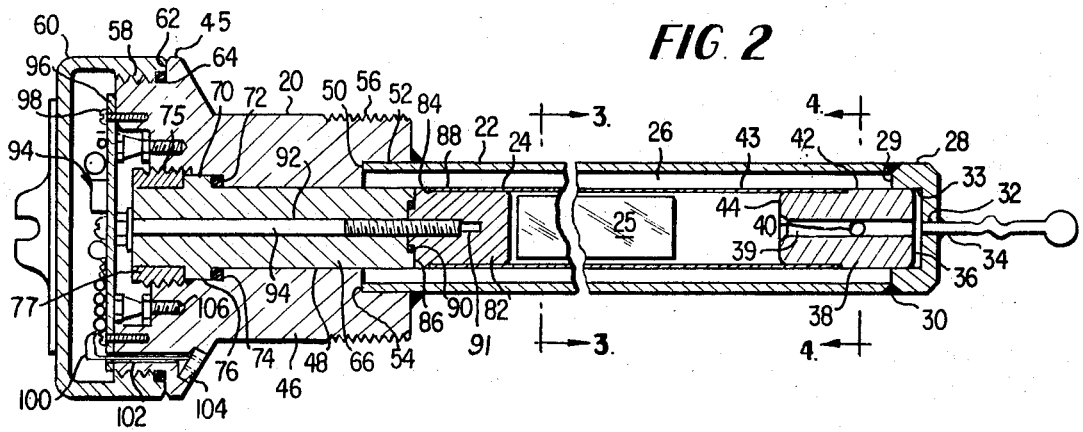
FIG. 2 is a longitudinal section in elevation of the temperature probe of FIG. 1.
Figure 3:
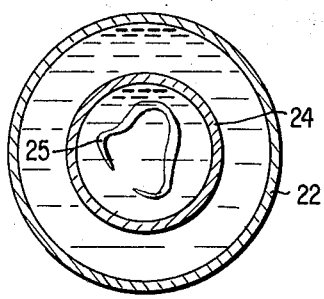
FIG. 3 is a section in elevation, taken along the line 3—3 of FIG. 2.
Figure 4:
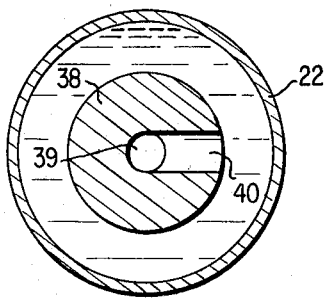
FIG. 4 is a section in elevation taken along the line 4—4 in FIG. 2.

With reference to FIGS. 2, 3 and 4 where like elements have been accorded like numeral designations to facilitate an understanding of the invention, the temperature probe of the present invention generally comprises an elongated housing 20 having a portion 22 carried in spaced relation to and in electrical isolation from a central member 24 having a fluid volume change accommodating element 25 disposed therein.

The portion 22 of the housing 20 forms one plate or electrode of the probe and is electrically and thermally conductive and is preferably an elongated, cylindrical, fluid impervious member having a centrally disposed cavity 26 running longitudinally therethrough to provide a cylindrical housing wall of substantially uniform thickness. The exterior of the electrode may be coated with a paraffin deposit resistant material.

The central member 24 which forms the second plate or electrode of the capacitor is electrically conductive, is substantially hollow, and is concentrically disposed within the portion 22 of the housing 20. As previously described, a fluid volume change accommodating element 25 is disposed within the hollow interior of the electrode 24 to provide a means for accommodating temperature induced changes in the volume of the fluid confined within the electrode 22. The element 25 is preferably a sealed plastic bag filled with a suitable compressible gas such as freon, but may alternatively be a piston, bellows or other resilient element. The location of the bag within the electrode is a significant feature as will be hereinafter explained.

A cylindrical end cap 28 having a radial shoulder 29 abutting the internal end 30 of the portion 22 forms one end of the cavity 26 of the housing 20. The end cap 28 may be physically secured to the housing 20 in any suitable conventional and liquid impervious manner, e.g., by welding. The end cap 28 may be provided with an axial fluid passage 32 and a rearward facing counterbore 33 coaxial therewith. An elongated sealable fill tube 34 may be inserted into the passage 32 and secured there by any conventional means such as by welding.

One end 36 of electrically non-conductive, substantially cylindrical centering plug 38 having a fluid passage 39 extending axially therethrough is carried by the counterbore 33 in the end cap 28 in coaxial and spaced relation to the portion 22 of the housing 20. A transverse fluid passage 40 provides fluid communication between the outer cylindrical surface 42 of the centering plug 38 and the centrally disposed axial fluid passage 39. The other end 44 of the centering plug 36 is utilized to center one end 43 of the electrode 24, thereby aligning the axis of the electrode 24 with the axis of the electrode 22 and providing a uniform spacing between the two plates of the capacitor.

The end 45 of the probe external of the pipe includes a cylindrical body 46 having a bore 48 running axially therethrough. A radial shoulder 50 provided by a counterbore 52 at the internal end of the body 46 abuts the external end 54 of the electrode 22. The electrode 22 may be secured against removal and sealed to the body 46 in any suitable and conventional manner such as by welding.

The body 46 may be externally threaded at both ends 56 and 58 thereof. An internally threaded electrically insulative cover 60 may then be secured to the external end 58 of the body 46 in abutting relation to an annular flange 62. A conventional sealing member 64 such as an O-ring between the shoulder 62 and the forward facing end of the cover 60 is desirably provided to prevent exposure of the electronic circuits to the atmosphere.

With specific reference to FIG. 2, an electrically insulative bushing 66 in the bore 48 is provided, as illustrated, with an annular flange 70. A conventional sealing member 72 such as an O-ring is desirably provided between the flange 70 and a rearward facing shoulder 74 provided by a counterbore 76 in the body 46 to prevent escape of the fluid from the cavity 26. The axial force on the shoulder 74 necessary to insure proper sealing and to prevent the removal of the bushing 66 from the bore 48 is provided by the cooperation of an externally threaded insert 76 with the threads 75 of the counterbore 76 to urge the bushing 66 into engagement with the rearward facing shoulder of the flange 70.

A generally cylindrical electrically conductive centering plug 82 having an annular flange 84 at the external end thereof abuts the internal end 86 of the bushing 66. A forward facing shoulder of the plug 82 abuts the rearward end 88 of the electrode 24. A fluid impervious seal 90 desirably is provided between the bushing 66 and the centering plug 82.

The centering plug 82 is provided with an internally threaded axial blind bore 91 aligned with a bore 92 in the bushing 66. An electrically conductive bolt 94 extends through the bore 92 of the bushing 66 into threaded engagement with the plug 82.

An oscillator circuit 94 is mounted on a circuit board 96 at the external end of the body 46 in a conventional manner, e.g., by threaded fasteners 98. Power is supplied to the oscillator 94 and the output signal taken therefrom by means of suitable wires 100 exiting the body 46 through a channel 102 and terminating in a terminal block 104.

The resonant tank circuit of the oscillator 94 includes the capacitor formed by the electrodes 22 and 24. The electrical connection from the oscillator 94 to the electrode 22 may be made by means of conventional banana plugs and jacks 106 threadably secured to the body 46 which is welded or otherwise secured to the electrode 22 which forms one plate of the capacitor. The other electrode 24 of the capacitor is electrically connected to the oscillator 94 by means of the bolt 94 and the centering plug 82.

As above described, the electrodes 22 and 24 are coaxial and define a fluid impervious annular fluid cavity 26 therebetween. The electrode 22 which forms one of the electrodes is electrically insulated from the other electrode 24 by means of the bushing 66 and centering plug 38.

Any air in the annular fluid cavity 26 and the interior of the electrode 24 may be evacuated through the tube 34 and replaced by a fluid, such as electrical transformer oil having the desired dielectric and temperature response characteristics. To be effective at high temperature, it is also desirable that the oil have a low flash point, good heat conductivity and be non-corrosive. The fill tube 34 may then be sealed by crimping and soldering the end thereof as illustrated in FIG. 2. The transformer oil then provides a dielectric medium between the capacitor plates and fills the interior of the electrode 24 except for the space occupied by the gas filled, sealed plastic bag 25.

In operation and as illustrated in FIG. 1, the temperature probe of the present invention may be inserted into the threaded aperture 14 in the pipeline 16, in a heat transmitting relationship to the fluid in the pipeline 16. As the temperature of the fluid in the pipeline 16 changes, the temperature and thus the dielectric constant of the fluid in the annular fluid cavity 26 will also change to vary the capacitance between the electrodes 24 and 22. As the capacitance changes, the resonant frequency of the tank circuit of the oscillator 92 varies proportionally thereby varying the frequency of the output signal of the oscillator 94. The output signal of the oscillator 94 is thus related to the temperature of the enclosed fluid and to no other parameter.

As disclosed in copending application, Ser. No. 750,675, now U.S. Pat. No. 3,566,685, assigned to the assignee of the present invention, the conventional capacitance probe utilized to measure watercut is responsive to changes in the dielectric constant of the fluid flowing in the pipeline due to changes in the oil/water ratio but the dielectric constant is also responsive to changes in temperature. A probe of this type is illustrated in copending application, Ser. No. 718,694 assigned to the assignee of the present invention. By isolating the dielectric changes due to temperature with the probe of the present invention, the oil/water ratio, as measured by the conventional probe, can be compensated.

The transformer oil is free to expand and contract without deforming the electrode 22 and the electrode 24 due to the gas filled bag 25 which accommodates temperature induced changes in fluid volume. Thus, the spacing between the electrodes 22 and 24, i.e., the size of the annular fluid cavity, remains constant throughout a substantial temperature range. In addition, the relatively small volume of the annular fluid cavity 26 reduces the response time of the temperature probe to changes in the temperature of the pipeline fluid.

The placement of the gas filled bag 25 within the electrode 24 is of significance since the gas is thus remote from the area between electrodes and changes in the volume of the gas cannot effect the frequency response of the probe. The normal operating frequency of the present invention is about 2.5 megahertz with a change of 68 kilohertz representing a 3 percent change in watercut. A change of 10° F. represents a 0.1 percent change in watercut. Temperature compensation is, therefore, critical for an instrument designed to operate with 0.1 percent watercut accuracy.

The present invention may thus be embodied in other specific forms without departing from the spirit or essential characteristics thereof. The presently disclosed embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A temperature responsive capacitance probe comprising:
    an elongated housing having a first portion adapted to be inserted through an aperture in a fluid confining surface into heat exchange relation with said fluid, said first portion defining an elongated fluid cavity and forming one electrode of a capacitor;
    a member carried by said housing within said fluid cavity, said member forming the other electrode of said capacitor;
    a second fluid disposed in said fluid cavity in heat exchange relation to said first portion;
    oscillator means for providing an electrical output signal having a frequency related to the dielectric constant of the fluid in said fluid cavity between the electrodes of said capacitor; and
    means disposed within said member for accommodating temperature induced changes in the volume of said second fluid.

2. The probe of claim 1 including means for providing fluid communication between the space between the electrodes of said capacitor and the interior of said member.

3. The probe of claim 2 wherein said fluid volume accommodating means comprises a gas tight envelope.

4. The probe of claim 3 including a volume of freon gas sealed within said envelope.

5. The probe of claim 4 wherein said first mentioned fluid is substantially a mixture of a hydrocarbon and water and wherein said second fluid is a hydrocarbon having a dielectric constant similar to the dielectric constant of the hydrocarbon in said first mentioned fluid.

6. The probe of claim 5 including a coating of a paraffin deposit resistive material on the external surface of said housing.

7. The probe of claim 6 wherein said housing includes a second portion larger in cross-section than said first portion, and wherein said oscillator means is mounted within a cavity defined by said second portion.

8. The probe of claim 1 wherein said fluid volume accommodating means comprises a fluid tight envelope.

9. The probe of claim 8 including a coating of a paraffin deposit resistive material on the external surface of said housing.

10. The probe of claim 8 wherein said housing includes a second portion larger in cross-section than said first portion, and wherein said oscillator means is mounted within a cavity defined by said second portion.

11. A condition responsive capacitance probe comprising:
    a first elongated, fluid impervious, hollow cylindrical member of electrically and thermally conductive material adapted to be inserted through an aperture in a fluid confining surface;
    a second elongated, substantially hollow, electrically conductive cylindrical member;
    means for mounting said second member coaxially with said first member in electrical isolation therefrom to provide an annular fluid cavity between said members;
    means for providing fluid communication between said annular fluid cavity and the interior of said second member;
    a dielectric fluid confined within said first member in heat exchange relation to said first mentioned fluid;
    fluid enclosing means within said first member for accommodating temperature induced changes in the volume of said dielectric fluid; and
    a signal generator electrically connected to said first and second members, the frequency of the signal generated by said signal generator being related to the dielectric constant of said dielectric fluid in said annular fluid cavity and to the temperature of said first mentioned fluid.

12. The probe of claim 11 wherein said volume means is disposed within said second member.

13. A temperature responsive capacitance probe comprising:
    an elongated housing having a first portion adapted to be inserted through an aperture in a fluid confining surface into heat exchange relation with said fluid, said first portion defining a fluid cavity and forming one electrode of a capacitor;
    a member carried by said housing within said fluid cavity, said member forming the other electrode of said capacitor;
    a second fluid disposed in said fluid cavity in heat exchange relation to said first portion;
    oscillator means for providing an electrical output signal having a frequency related to the dielectric constant of the fluid in said fluid cavity between the electrodes of said capacitor; and,
    fluid enclosing means within said member for accommodating temperature induced changes in the volume of said second fluid.

14. The probe of claim 11 including a volume of freon gas sealed within said fluid tight envelope.

15. The probe of claim 13 wherein said first mentioned fluid is substantially a mixture of a hydrocarbon and water;
    wherein said second fluid is a hydrocarbon having a dielectric constant similar to the dielectric constant of the hydrocarbon in said first mentioned fluid;

wherein said housing includes a second portion larger in cross-section than said first portion;
wherein said oscillator means is mounted within a cavity defined by said second portion; and,
wherein said housing is provided with a paraffin deposit resistive coating on the external surface thereof.

16. A temperature responsive capacitance probe comprising:
an elongated housing having a first portion adapted to be inserted through an aperture in a fluid confining surface into heat exchange relation with said fluid, said first portion defining an elongated fluid cavity and forming one electrode of a capacitor;
a member carried by said housing with said fluid cavity, said member forming the other electrode of said capacitor and axially overlapping at least a portion of said one electrode;
a second fluid disposed in said fluid cavity in heat exchange relation to said first portion;
oscillator means for providing an electrical output signal having a frequency related to the dielectric constant of the fluid in said fluid cavity between the electrodes of said capacitor; and
means disposed axially within the overlap of said electrodes but not radially between said electrodes for accommodating temperature induced changes in the volume of said second fluid.

* * * * *